A. VERMERSCH.
SUSPENSION SPRING FOR VEHICLES.
APPLICATION FILED SEPT. 16, 1912.
1,082,217.
Patented Dec. 23, 1913.
2 SHEETS—SHEET 1.
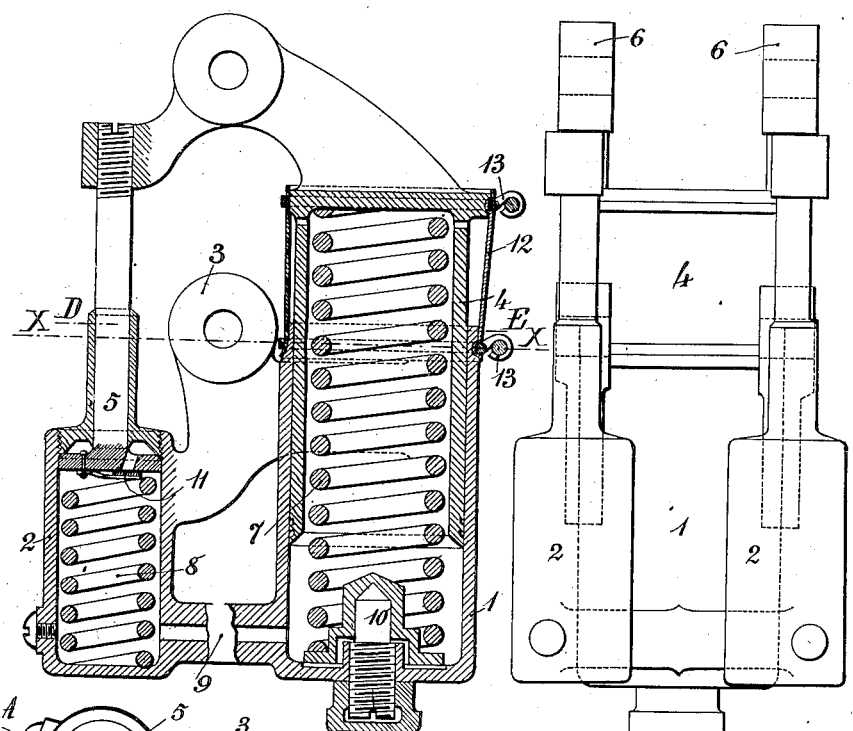

A. VERMERSCH.
SUSPENSION SPRING FOR VEHICLES.
APPLICATION FILED SEPT. 16, 1912.
1,082,217.
Patented Dec. 23, 1913.
2 SHEETS—SHEET 2.
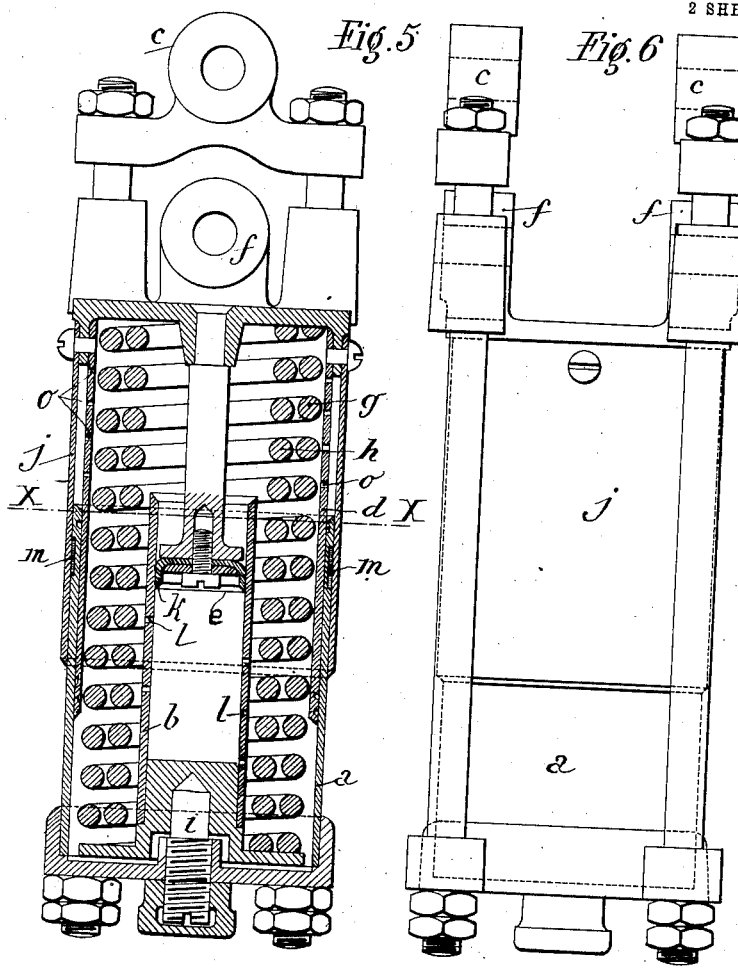
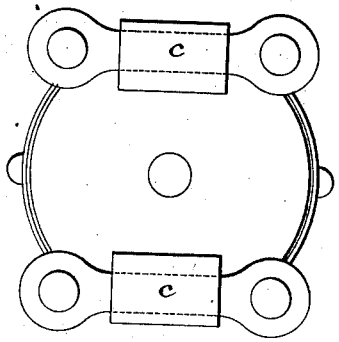
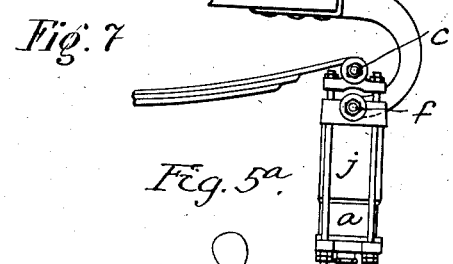

UNITED STATES PATENT OFFICE.

ADOLPHE VERMERSCH, OF LILLE, FRANCE.

SUSPENSION-SPRING FOR VEHICLES.

1,082,217. Specification of Letters Patent. Patented Dec. 23, 1913.

Application filed September 16, 1912. Serial No. 720,667.

*To all whom it may concern:*

Be it known that I, ADOLPHE VERMERSCH, a citizen of the Republic of France, residing at Lille, France, have invented certain new and useful Improvements in Suspension-Springs for Vehicles, of which the following is a specification:—

This apparatus is intended to counteract the strong oscillations of the laminated springs used in vehicles and more particularly motor cars, and consequently to provide a very smooth suspension and to protect the whole mechanism.

In the accompanying drawing, Figures 1–4 illustrate apparatus intended generally for the front of the cars. Fig. 1 is a vertical section on line A B C in Fig. 3; Fig. 1ª illustrates the connection of the device shown in Fig. 1 to a vehicle. Fig. 2 is a side elevation; Fig. 3 is a horizontal section on line D E in Fig. 1; Fig. 4 is a plan of the small pistons upside down. Figs. 5, 6 and 7 illustrate apparatus intended generally for the rear of the cars. Fig. 5 is a vertical section; Fig. 5ª illustrates the connection of the device shown in Fig. 5 to a vehicle. Fig. 6 is a side elevation; Fig. 7 is a plan.

The apparatus shown in Figs. 1 to 4 comprises, on the one hand, a large cylinder 1 and two small cylinders 2, the whole in one piece with the strap or shackle 3 connected to the leaf spring of the car; on the other hand, a large hollow piston or plunger 4 and two small pistons 5, the whole in one piece with the shackle 6 secured to the frame of the car.

The interior of the cylinders contains helical springs 7 and 8, the small ones of which must practically balance the larger one. The said cylinders also contain oil or other similar material, and the bottom of the small cylinders communicates with the large one by means of the conduits 9. Finally a screw 10 enables the tension of the large spring 7 to be regulated. The small pistons 5 are provided with several holes, one of which is provided with a flap valve 11, affording a gradual passage to the oil. A sheath of leather or other supple material 12 secured by means of two collars 13, protects the rubbing part of the large piston against dirt and dust.

The apparatus shown in Figs. 5, 6, and 7 comprises, on the one hand, a large cylinder *a* and a small one *b* contained one within the other and connected by a shackle *c* to the laminated or leaf spring of the car; and on the other hand, a large hollow piston *d* and a small one *e*; the whole forming one piece with the shackle *f* connected to the frame of the car.

Two concentric helical springs *g* and *h* are arranged between the two cylinders. A bottom screw *i* is intended to regulate their tension, and oil or other similar material occupies the whole interior of the cylinders; finally a sheath *j* secured to the upper portion of the large cylinder, protects the rubbing portion of the said piston from dirt and dust.

The small piston *e* is formed by leathers *k*, and its cylinder is provided throughout the whole of its height with a number of holes *l*.

The number of springs can be any desired, and if necessary different regulations can be provided for the tensions.

The operation of the device when attached to the front wheels of a vehicle is the following: When, owing to a shock transmitted by the leaf spring, the cylinders 1 and 2 rise and compress the helical springs, the oil contained in them, is forced out through the free holes of the small pistons 5; thus the shock received is deadened, any jumping of the frame and excessive strain on the leaf spring is avoided, and thus the car is smoothly suspended. The helical springs in their descent resume their original position more quickly owing to the valve 11 affording a larger passage to the oil.

The operation of the device when attached to the rear wheels of the vehicle is the following: For the same shocks as before, the cylinders *a* and *b* rise and compress the helical springs, the oil contained below the small piston, passes through the holes *l*, quickly in the beginning, and then gradually while the holes are being closed by the small piston *e*, and the passage for the oil is reduced. The descent of the cylinders, and consequently the resumption of normal tension by the springs, takes place more quickly owing to the oil being able to pass between the leathers of the piston *e* and its cylinder, the leathers being then compressed. This latter apparatus, like the former, produces a smooth suspension.

Claims:

1. Spring suspension mechanism for vehicles comprising three communicating, oil-containing cylinders, two of which being smaller than the third, helical springs in each of said cylinders, the springs within the smaller cylinders balancing the spring in the larger one, means for connecting the cylinders with the vehicle spring, conduits establishing communication between the cylinders and the bottom thereof, means for regulating the tension of the large spring, and pistons within said cylinders of dimensions to suit the dimension of said cylinders, the smaller pistons each provided with a valved opening and a free opening and means for protecting the exposed portion of the large piston against dirt and dust, substantially as described.

2. Spring suspension mechanism for vehicles, comprising three communicating, oil-containing cylinders, two of which being smaller than the third, helical springs in each of said cylinders, the springs in the smaller cylinders balancing the spring in the larger one, straps for connecting the cylinders with the vehicle spring, conduits establishing communication between the cylinders at the bottom thereof, a screw for regulating the tension of the large spring, and pistons within said cylinders of dimensions to suit the dimensions of said cylinders, the smaller pistons each provided with a valved opening and a free opening, and a protecting sheath of pliable material for the exposed portion of the large piston, and means for securing said sheath to the cylinder containing the large piston, substantially as described.

In testimony whereof I affix my signature in presence of two witnesses.

ADOLPHE VERMERSCH.

Witnesses:
  G. VEILTETT,
  PAIDIE.